Nov. 3, 1970     A. D. LAWSON     3,538,458
DC TO AC CONVERTER CONTROL CIRCUIT PRODUCING VARIABLE
PULSE WIDTH AND REVERSIBLE PHASE AC

Filed June 21, 1968     2 Sheets-Sheet 2

INVENTOR.
ARNOLD D. LAWSON
BY
*HP Terry*
ATTORNEY

United States Patent Office 3,538,458
Patented Nov. 3, 1970

3,538,458
DC TO AC CONVERTER CONTROL CIRCUIT PRODUCING VARIABLE PULSE WIDTH AND REVERSIBLE PHASE AC
Arnold D. Lawson, Phoenix, Ariz., assignor to Sperry Rand Corporation, a corporation of Delaware
Filed June 21, 1968, Ser. No. 738,989
Int. Cl. H03k 7/08; H02p 7/28
U.S. Cl. 332—9          5 Claims

ABSTRACT OF THE DISCLOSURE

A control circuit including a pair of differential amplifiers with a common output having a first input on each amplifier connected to a modulated DC control signal and a second input connected to one of two 180° phase displaced AC potentials which are derived from an AC reference potential. The AC reference potential is delayed 90° in-phase and applied to an electronic chopper to modulate the DC control signal. The common output is an AC signal having a pulse width and phase related to the amplitude and phase respectively of the DC control signal. The output AC signal is applied to the control winding of an AC servomotor.

BACKGROUND OF THE INVENTION

In many control systems such as servomechanisms it is desired to control an AC motor, such as a two-phase motor in proportion to the magnitude and polarity of a DC control signal. While this has been accomplished in the past by a wide variety of circuits, they have usually been relatively complex and hence expensive. Furthermore, in recent years use of all DC control systems has become desirable, primarily from the standpoint of overall accuracy and simplicity of the electronics involved. However, AC drive motors remain desirable as actuator or power devices. Furthermore, it is desired to control electrical power to the servomotor in the most efficient manner.

SUMMARY OF THE INVENTION

Hence, the present invention provides a relatively simple inexpensive electronic circuit for converting a DC control signal to AC for controlling an AC servomotor. Furthermore, the present circuit provides a reversible AC signal having a constant amplitude square wave, or pulse, the width of the pulses depending upon the magnitude of the DC control signal and the phase dependent upon the polarity thereof. Since the control phase of the two-phase motor is supplied with square wave pulses having constant amplitude but variable width, the motor is controlled very efficiently in terms of electrical power.

The foregoing is accomplished by means of a pair of differential transistor amplifiers, operating open loop, each of which is controlled from a common DC signal input and the in-phase and out-of-phase AC reference voltages, respectively, the latter being supplied from a center-tapped input transformer. The outputs of the amplifiers are current summed across an output resistor and with no DC control signal present, the resulting square wave currents are 180° out-of-phase producing zero output voltage. The DC control signal is modulated or chopped by the reference AC voltage which has been phase shifted by 90° whereby when applied to the common input of the differential amplifiers, it causes their switching points to be shifted in time and hence their current outputs to be shifted in phase with respect to each other. This phase shift of the current square waves occurs about 0° and 180° points of the reference AC and allows a voltage proportional thereto to develop across the output resistance, resulting in an AC voltage pulse train, the width of the pulses being proportional to the magnitude of the DC signal and the phase being representative of the polarity of the DC control signal.

BRIEF DESCRIPTION OF THE DRAWINGS

A preferred embodiment of the present invention is illustrated in the accompanying drawings wherein.

DESCRIPTION OF THE PREFERRED EMBODIMENT

Figure 1:
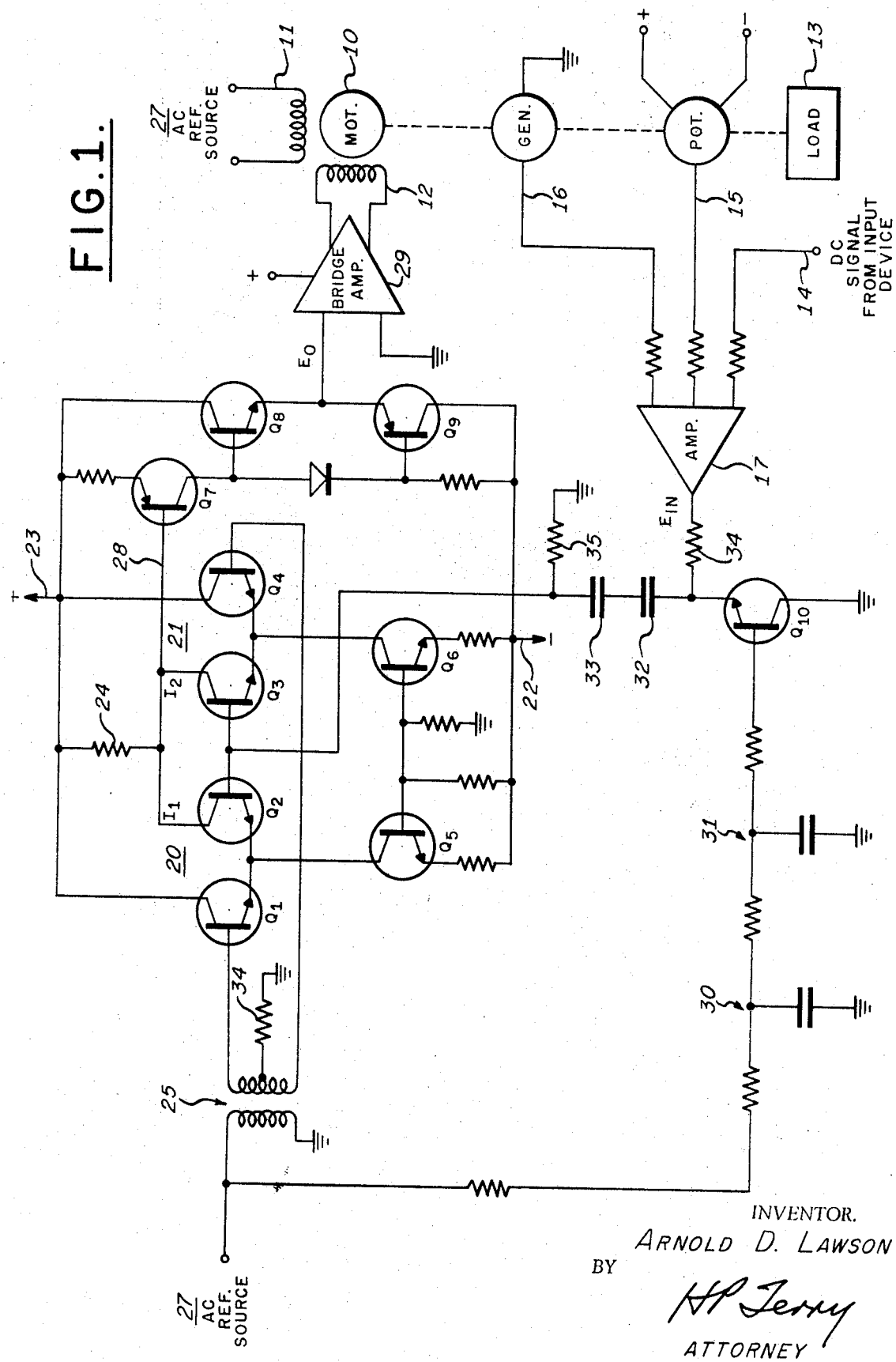
FIG. 1 is a schematic drawing of the modulator of the present invention incorporated in an otherwise conventional AC servomotor control system.

Referring now to FIG. 1, there is illustrated a conventional displacement servomechanism including a two-phase servomotor 10, having an AC reference winding 11 and an AC control winding 12 connected to drive a desired load 13 in accordance with DC input signals applied at terminal 14 from an input device (not shown). Position feedback signals via lead 15 and rate feedback signals via lead 16 may be employed in a conventional manner. The DC error signal to the servomotor control of the present invention is derived from a conventional summing amplifier 17 responsive to the DC input signals as well as the position and rate feedback signals.

In accordance with the teachings of the present invention, pulse width modulation of the DC control signal is accomplished by the detailed circuit of FIG. 1. A pair of differential amplifiers 20 and 21 include, respectively, transistors $Q_1$, $Q_2$ and $Q_3$, $Q_4$. The emitters of the transistors $Q_1$ and $Q_2$ are connected together and to a common source 22 of constant negative DC current via a current regulator transistor $Q_5$. Similarly, the emitters of the transistors $Q_3$ and $Q_4$ are connected together and to the source 22 via a current regulator transistor $Q_6$. The collectors of the transistors $Q_1$ and $Q_4$ are connected directly to a suitable common source 23 of positive DC current while the collectors of the transistors $Q_2$ and $Q_3$ are connected together and to the source 23 through a common resistance 24, the common terminal constituting the output of the differential amplifiers 20 and 21. The bases of the transistors $Q_1$ and $Q_4$ are connected to receive in-phase and out-of-phase AC voltages respectively from the center-tapped secondary of a supply transformer 25, the primary of which is connected to a source 27 of reference AC. The bases of the transistors $Q_2$ and $Q_3$ are connected together and to be responsive to the DC control signal or error signal from the output of the summing amplifier 17.

The output of the modulator of the present invention is provided on a lead 28. The output is preamplified by a transistor $Q_7$ and power amplified by a conventional push-pull amplifier having transistors $Q_8$ and $Q_9$ connected in emitter-follower fashion to a motor amplifier 29, which may be of the conventional balanced bridge type. Its output is connected to energize the control winding 12 of the two-phase servomotor 10.

In accordance with the teachings of the present invention, the DC control signal from the amplifier 17 is chopped or switch-modulated by the AC reference voltage after the latter is shifted in phase by 90°. For this purpose the AC reference from the source 27 is passed through a lag circuit comprising conventional series connected RC networks 30 and 31, respectively. The phase shifted reference is resistance coupled to the base of a transistor switch $Q_{10}$, the collector of which is connected to ground and the emitter of which is connected to the DC control signal.

Back-to-back capacitors 32 and 33 provide AC isolation while resistors 34 and 35 serve as impedance matching resistors for the circuit.

Figure 2:
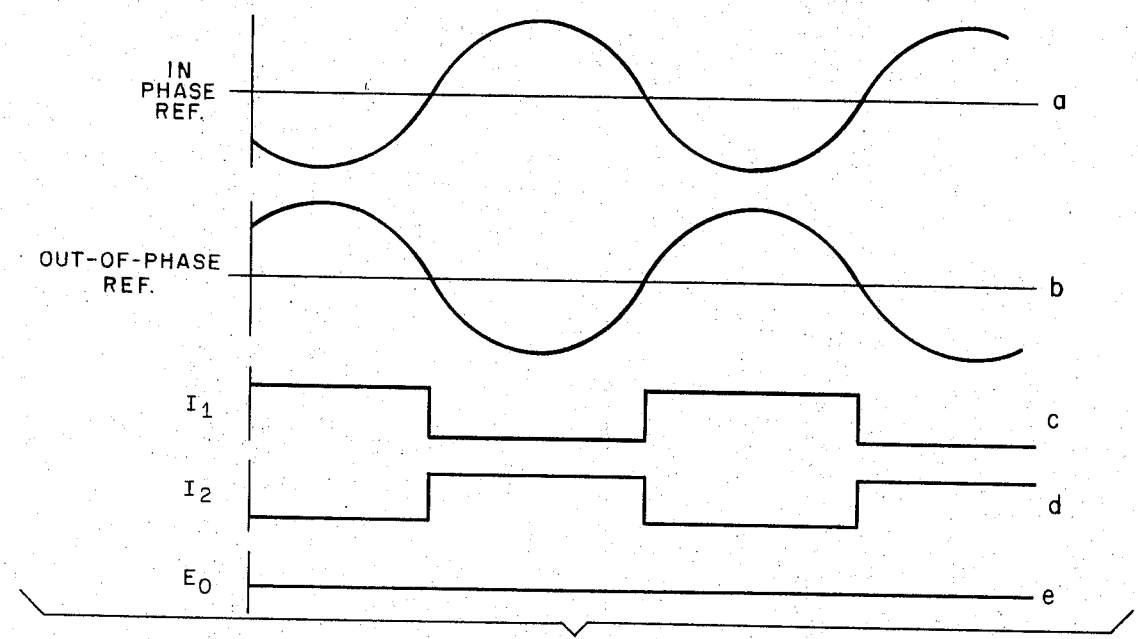
FIG. 2 is a series of waveforms useful in understanding the operation of the invention when the control signal is zero.
Figure 3:
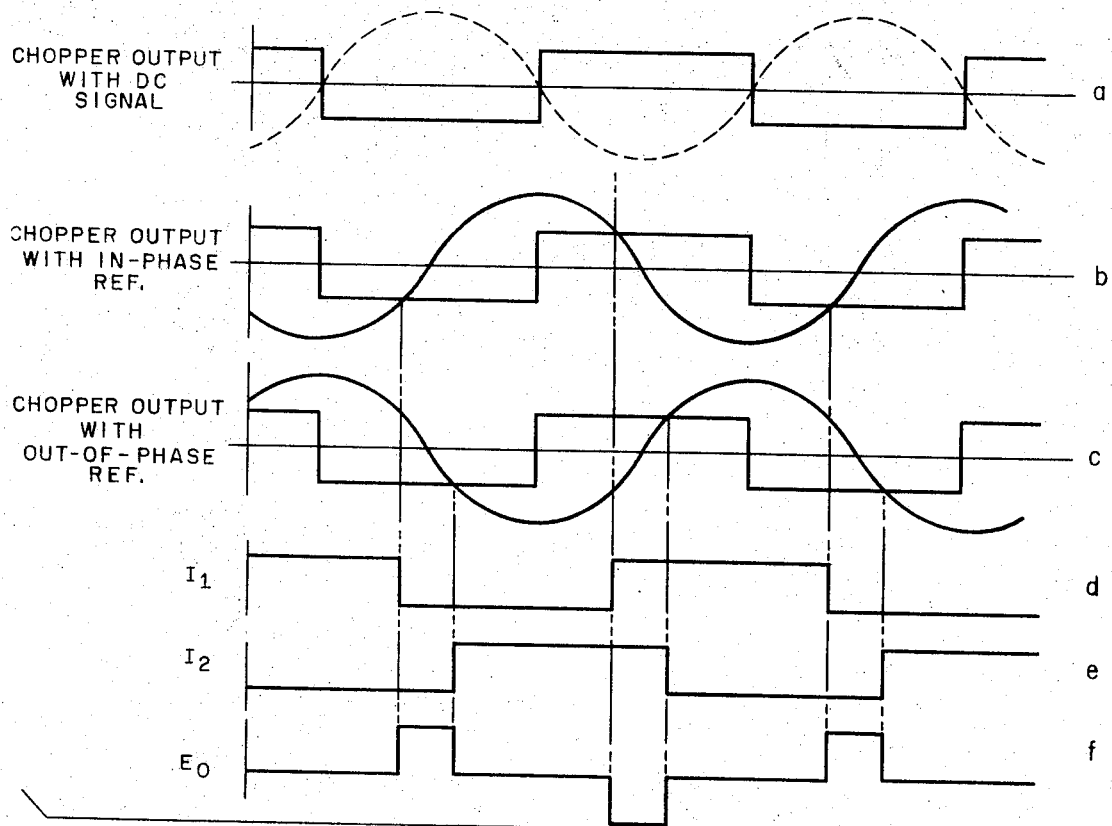
FIG. 3 is a similar series of waveforms for illustrating the operation of the present invention when the control signal is other than zero.

The operation of the pulse width modulator of the present invention may be explained by reference to FIGS. 2 and 3. With no DC control signal applied at the bases of the transistors $Q_2$ and $Q_3$, the out-of-phase reference voltages, shown as curves $a$ and $b$ of FIG. 2, applied to the bases of the transistors $Q_1$ and $Q_4$ causes the latter transistors to conduct alternately and to produce alternate and equal current flow through the resistor 24 via the transistors $Q_2$ and $Q_3$ shown as curves $c$ and $d$ of FIG. 2. These currents being of equal sense and magnitude and summed through the resistance 24 prevent any voltage from building up on the output lead 28 of the differential amplifiers 20 and 21 as shown in curve $e$ of FIG. 2. Thus, no output voltage is supplied to the base of the amplifier $Q_7$.

Now it is assumed a DC error voltage is supplied from the amplifier 17. This DC signal is square wave modulated by the 90° phase shifted reference AC applied to the base of the transistor switch $Q_{10}$ resulting in a square wave having an amplitude proportional to the magnitude of the DC control voltage and a frequency equal to the reference frequency as shown in curve $a$ of FIG. 3. As shown by curves $b$ and $c$ of FIG. 3, this voltage when applied to the bases of the transistors $Q_2$ and $Q_3$ serves to phase shift the switching points of these transistors (on the slopes of the reference AC centered about the 0° and 180° points thereof) and thereby unbalances the currents through the resistor 24. Thus, as shown by curves $d$ and $e$ of FIG. 3, there will be no current through the resistor 24 for the period of the unbalance and a constant voltage will exist at the output lead 28 of the differential amplifiers 20 and 21 and therefore at the base of the amplifier $Q_7$ for this period. The time extent of this period will depend upon the magnitude of the DC control signal; the smaller this signal the narrower the output voltage pulse while the larger this signal the wider the output voltage pulse. The frequency, of course, remains the same since the pulse width variation always occurs about the 0° and 180° points of the reference frequency.

The pulse width modulated output signal is voltage amplified by the amplifier $Q_7$ and power amplified by the push-pull amplifier having transistors $Q_8$ and $Q_9$ in a conventional manner.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus for converting a reversible polarity, variable magnitude DC control signal to a square wave AC signal having a pulse width variable with the magnitude of said DC control signal and a phase reversible in accordance with the polarity of said control signal comprising
    (a) a source of reference AC signals,
    (b) means coupled to said reference source for providing first and second AC signals in-phase and 180° out-of-phase therewith respectively,
    (c) a source of variable magnitude, reversible polarity DC control signals,
    (d) common summing means,
    (e) first and second differential amplifier means having their respective outputs connected to said common summing means and their first inputs connected to said first and second AC signals respectively and their second inputs connected to said source of DC control signals for providing alternating square wave current flows through said common summing means,
    (f) means responsive to said reference AC signals for shifting its phase 90°,
    (g) means responsive to said DC control signals and said phase shifted reference AC signals for square wave modulating said DC control signals, the amplitude and phase of said resultant square wave corresponding to the magnitude and polarity of said DC control signals, and
    (h) means for supplying said modulated DC control signals to said differential amplifier means for respectively advancing and delaying said square wave currents through said common summing means whereby to produce alternating square wave voltage output pulses at the reference frequency and having a pulse width proportional to the magnitude of said DC control signals and a phase corresponding to the polarity thereof.

2. Apparatus of the character recited in claim 1 further including
   a source of constant potential DC signals,
   said first and second differential amplifier means connected to said constant potential DC signals.

3. Apparatus of the character recited in claim 1 in which said common summing means includes common impedance means.

4. Apparatus for the character recited in claim 3 in which said first differential amplifier means includes first and second transistors each having at least a base electrode, an emitting electrode, and a collecting electrode, and said second differential amplifier means includes third and fourth transistors each having at least a base electrode, an emitting electrode, and a collecting electrode,
   said emitting electrodes of said first and second transistors being interconnected,
   said emitting electrodes of said third and fourth transistors being interconnected,
   said interconnected electrodes being coupled to a common source of negative potential DC signals,
   said collecting electrodes of said first and fourth transistors being interconnected and coupled to a common source of positive potential DC signals,
   said collecting electrodes of said second and third transistors being interconnected and adapted to be coupled to said common source of positive potential DC signals via said common impedance means,
   said base electrodes of said first and fourth transistors being responsive to said in-phase and 180° out-of-phase reference AC signals respectively,
   said base electrodes of said second and third transistors being interconnected and responsive to said modulated DC control signals.

5. Apparatus of the character recited in claim 1 in which said means responsive to said reference AC signals for shifting its phase 90° includes RC lag circuit means.

References Cited

UNITED STATES PATENTS

| | | | |
|---|---|---|---|
| 3,090,929 | 5/1963 | Thompson. | |
| 3,260,912 | 7/1965 | Gregory | 318—341 |
| 3,315,181 | 4/1967 | Rosenthal | 332—9 |
| 3,354,371 | 11/1967 | Ainsworth et al. | 318—341 |

ALFRED L. BRODY, Primary Examiner

U.S. Cl. X.R.

307—265; 318—341; 320—58